G. F. SEIDENBECKER.
SPRING SUSPENSION FOR MOTOR VEHICLES AND THE LIKE.
APPLICATION FILED APR. 9, 1917.
1,259,912.
Patented Mar. 19, 1918.
3 SHEETS—SHEET 1.
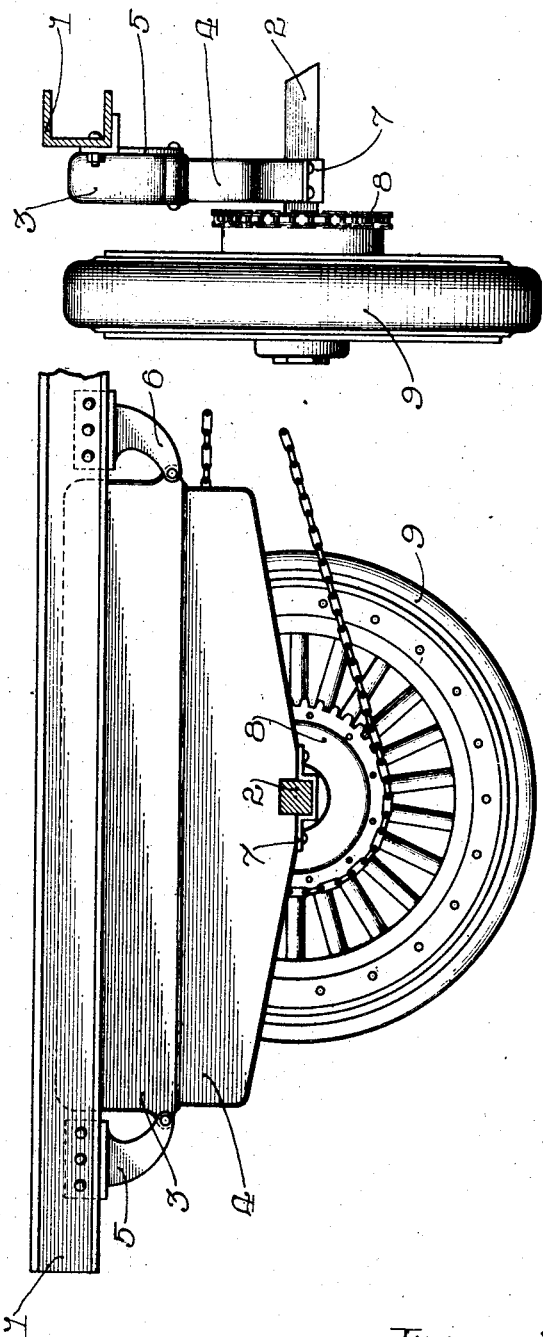
Inventor
Grover F. Seidenbecker
By Brown, Hanson & Boettcher
Attorneys.

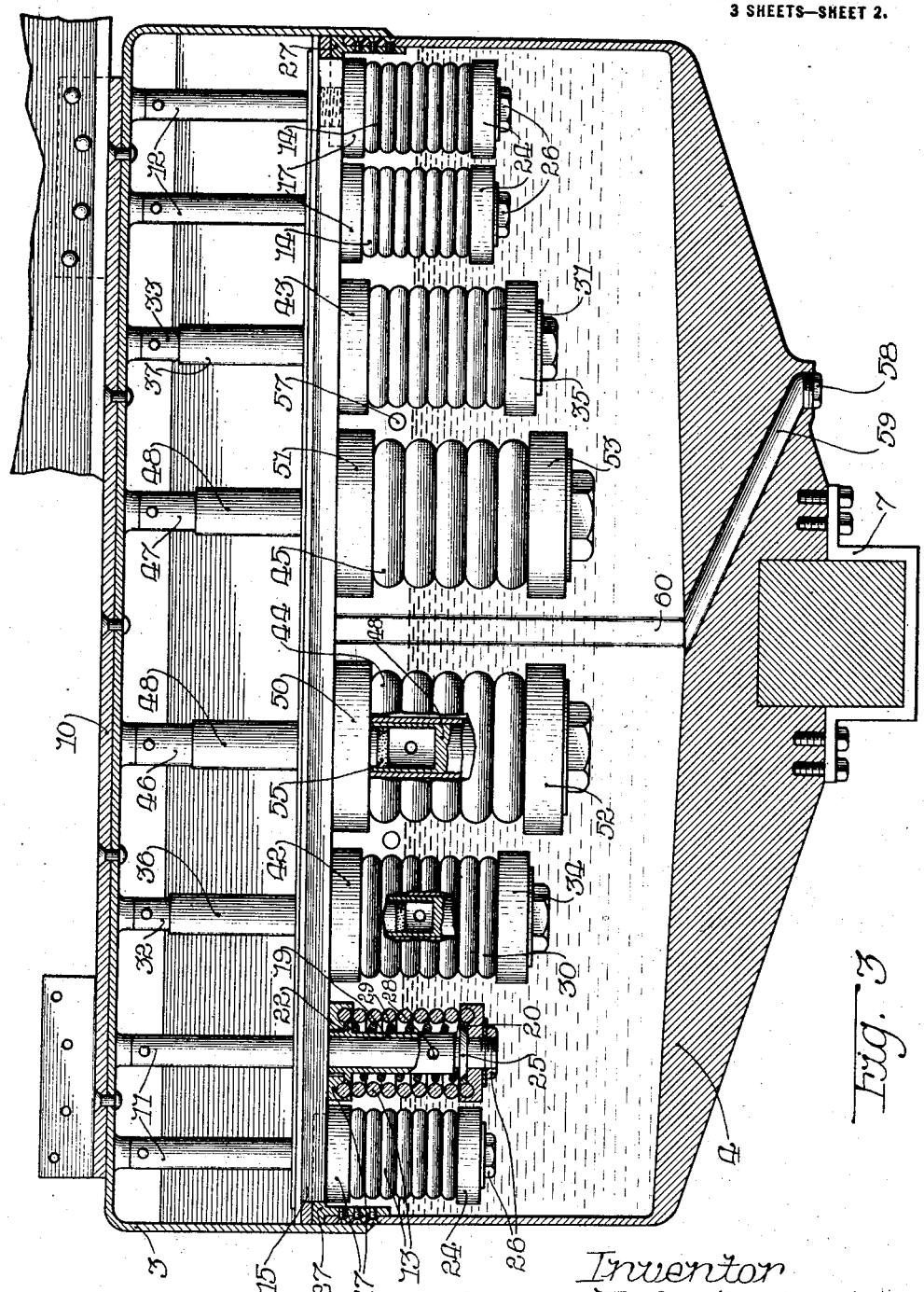

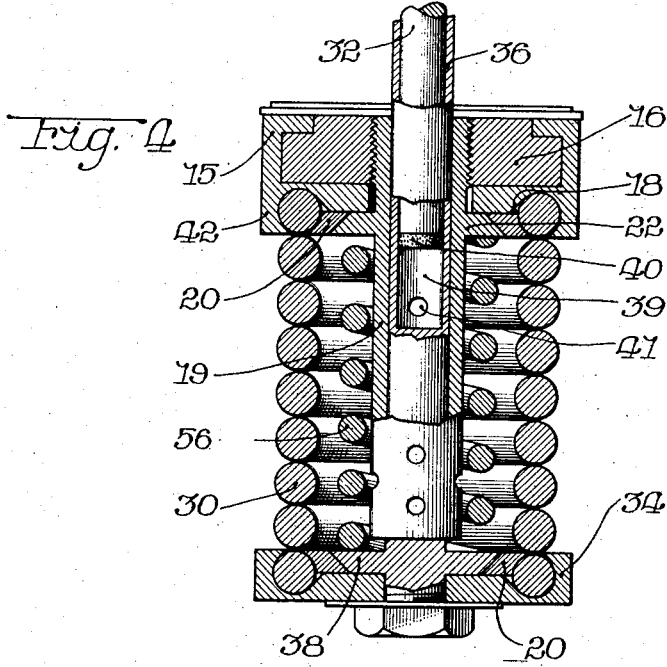
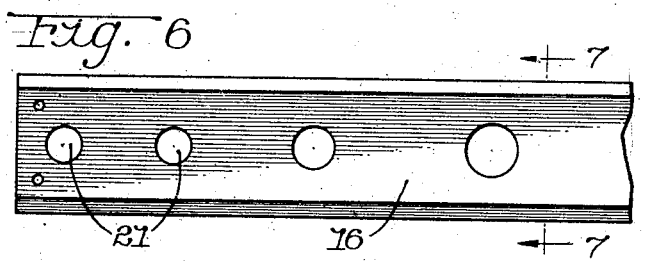
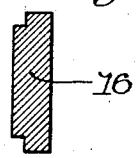
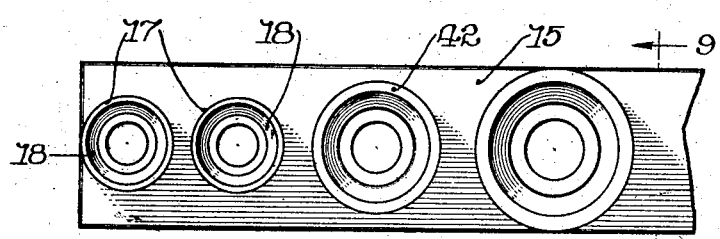
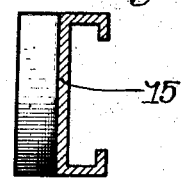

UNITED STATES PATENT OFFICE.

GROVER F. SEIDENBECKER, OF CHICAGO, ILLINOIS, ASSIGNOR OF ONE-HALF TO E. R. FRECH, OF CHICAGO, ILLINOIS.

SPRING SUSPENSION FOR MOTOR-VEHICLES AND THE LIKE.

1,259,912.　　　Specification of Letters Patent.　　Patented Mar. 19, 1918.

Application filed April 9, 1917. Serial No. 160,625.

*To all whom it may concern:*

Be it known that I, GROVER F. SEIDENBECKER, a citizen of the United States, residing at Chicago, in the county of Cook and State of Illinois, have invented a certain new and useful Improvement in Spring Suspensions for Motor-Vehicles and the like, of which the following is a full, clear, concise, and exact description, reference being had to the accompanying drawings, forming a part of this specification.

My invention relates to spring suspensions for motor vehicles and the like.

It is necessary to provide some form of connection between the body of the vehicle and the running gear which will prevent the transmission of shocks and vibrations from the running gear to the body of the vehicle.

Various forms of spring connections have long been employed. As heretofore known spring suspensions have generally been subject to the fault that no provision has been made for the different loads which a vehicle may be called upon to carry. The vehicle is usually provided with a spring which will sustain the capacity load. At that load the body is perhaps properly suspended. If less than full load is carried the springs do not yield, hence they act like a solid connection making the vehicle ride very hard. If greater than capacity load is applied the spring yields too far and may easily be damaged.

My invention aims to provide an improved spring suspension which will adjust the effective acting spring strength to the load which is being carried.

According to my invention the body is suspended on the running gear by a relatively weak primary spring which acts first of all as a calibating spring for the purpose of applying additional spring tension as the load increases. The primary spring also serves in the capacity of a load supporting spring for light loads of the vehicle. As soon as the vehicle is loaded beyond a certain predetermined value, as determined by the calibration of the primary spring, another set of springs which I term the secondary spring is brought into play. The primary and secondary springs then support such load as they are designed to sustain and if further load is imposed these springs will pass the load on to a further spring which I term the master spring which is designed to carry the heaviest load to which the vehicle is subject.

I do not intend to be limited to the use of any certain number of springs, as the device which I shall describe in detail is not the only form in which the invention may appear.

In the accompanying drawings which form a part of the present specification I have illustrated one embodiment of my invention.

Figure 1 is a side elevation of a novel form of spring suspension embodying my invention applied between the frame and axle of a truck;

Fig. 2 is a rear end elevation of the same;

Fig. 3 is a longitudinal central section of the device shown in Figs. 1 and 2;

Fig. 4 is a longitudinal section of one of the secondary springs and connected parts;

Fig. 5 is a detail isometric view showing the means for gripping the ends of the springs;

Fig. 6 is a plan view and Fig. 7 a cross sectional view of the supporting bar for sustaining the weight of the load which is transmitted to the spring; and Figs. 8 and 9 are a plan view and a sectional view of the attaching bar for the upper ends of the springs.

As shown in Figs. 1 and 2, the spring supporting means of my invention is adapted to be connected between the frame 1 and the axle 2 of a motor vehicle. The spring mechanism proper is housed in a casing or housing consisting of the upper casing 3 and the lower casing 4 between which the springs are connected. The upper casing 3 is connected to the frame 1 by means of suitable brackets 5, 6 and the lower casing 4 is connected to the axle 2 as by means of a suitable clamp or yoke 7.

For chain drive, as is illustrated in Figs. 1 and 2, a radius rod is not necessary as the spring suspension of my invention maintains the correct distance between the driving sprocket not shown and the driven sprocket 8 on the wheel 9.

The upper casing 3 is provided with a suitable supporting bar 10 which sustains the pressure imparted by the load supporting plungers. The load supporting plungers 11 and 12 are connected directly to the lower ends of the springs 13 and 14 which I term the primary springs. The springs 13 and 14 are secured at their upper ends to the attaching bar 15 (see Figs. 8 and 9) which in turn is supported upon the supporting bar 16. The attaching bar 15 is provided with socket members 17 having grooves or seats 18 into which the upper ends of the springs 13 are held by means of the flanged rings such as shown at 20 in Fig. 5.

A cylindrical guiding member 19 is provided with screw threads which are fastened in corresponding screw threads in the holes 21 of the supporting bar 16. The guiding cylinders 19 are provided with flanges 22 which fit on the interior of the retaining rings 20 holding the upper convolution of the corresponding spring in place.

The lower convolution of each of the springs 13 and 14 is fastened to a cylindrical block 24 in a similar manner. The flanged retaining ring 20 lies against the inner surface of the lowermost convolution of the spring and the retaining ring is held in place by the flange 25 which is formed upon the lower end of the rod 11. A suitable nut 26 is threaded upon the lower end of the rod holding the flange, the ring and the cylindrical block together in connection with the lowermost convolution of the spring. The plungers 11 and 12 are thus connected to the lower ends of the springs 13, 14, the upper ends of which springs are fastened to the attaching bar 15 and supported upon the supporting bar 16 which is in turn connected by means of suitable brackets 27 to the upper end of the casing section 4. It can now be seen that the upper casing section 3 which is connected to the frame of the vehicle is connected to the lower section 4 which is connected to the axle and running gear through the medium of the primary springs 13 and 14. The rods 11 and 12 slide within the cylindrical guiding members 19, these members being connected to the supporting bar and thus the two casing sections are held in alinement. The guiding member 19 is provided with oil holes such as shown at 28 to permit the body of oil which is contained in the lower part of the casing section to lubricate these parts. A small spring 29 of a different operating characteristic from the springs 13 and 14 is interposed between the flange 25 and the flange 22 to prevent too sharp a rebound. The secondary springs 30 and 31 are normally disconnected from their corresponding plungers 32 and 33. The lower ends of the plungers 32 and 33 are not connected to the cylindrical attaching blocks 34 and 35 but slide within the hollow stems 36 and 37 which are connected to the blocks 34 and 35. The stems 36 and 37 are connected as shown in detail in Fig. 4, each stem being provided with a conical flange 38 similar to the flange 25 previously described, these conical flanges bearing against the inside surfaces of suitable rings 20 that hold the lowermost convolution of the corresponding spring in a suitable groove or seat in the corresponding connecting block, such as 34, in Fig. 4. The stem 36 is hollow for a portion of its length, as may be seen in Fig. 4, the upper part being bored out to receive the plunger 32. The stem 36 slides within a cylindrical guiding member 19 which is connected to the attaching bar 15 as previously described and threaded to the supporting bar 16. The lower end of the plunger 32 is spaced away from the bottom of the bore 39 a sufficient distance so that the springs 13 and 14 must first be loaded to substantially their capacity before the plunger 32 is connected to the spring 30. A fibrous oil retaining pad 40 is mounted upon the lower end of the stem 32 to ease the engagement between these parts and to distribute oil along the side walls of the cavity 39. A suitable oil hole 41 in the side walls of the hollow portion of the stem 36 admits lubricating oil. The guiding member 19 is also perforated with oil holes as indicated in Fig. 4. It will be noted that the springs 30 and 31 are made of greater strength than the primary springs 13 and 14.

The master springs 44 and 45 are considerably larger and stronger than the primary or secondary springs. The master springs are normally disconnected from their corresponding plungers 46 and 47 in the same manner as the secondary spring. The distance between the bottom of the plunger 46 and the bottom of the bore in the corresponding stem member 48 is greater than the corresponding distance between the plunger and stem member for the springs 30, 31. This arrangement is provided to cause loading of the secondary springs 30, 31 before loading of the master springs 44 and 45. The master springs are connected at their upper ends to suitable sockets 50, 51 on the attaching bar 15 as was previously described in connection with Fig. 4 for the springs 30 and 31. The lower ends of the springs 44 and 45 are similarly attached to suitable attaching blocks 52 and 53 as described in connection with Fig. 4 for the springs 30 and 31. The stem 48 is similar in all respects to the stem 36 described in connection with Fig. 4. Suitable fibrous pads 55 are provided on the lower ends of the plungers 46 and 47. Thus, in all essential respects the construction of the springs 44 and 45 and connecting parts is similar to that described in connection with Fig. 4 for the springs 30 and 31 except as previously indicated that the plungers 46 and 47 are further removed from the bottom of the corresponding bores in the stem members so that the secondary springs will be loaded before the corresponding plungers engage the stems and load the master spring. In each case suitable checking springs 56, as shown in Fig. 4, surround the cylindrical guiding members 19 to relieve the rebound of the corresponding springs.

Suitable oil holes, as shown at 57, in Fig. 3, are provided for the introduction of oil into the bottom of the casing section 4. A draining plug 58 connected with a drain passage 59 permits the withdrawal of oil from the casing section 4. The casing sections 3 and 4 are arranged to overlap to keep out dust and foreign matter. The guiding of the two casing sections is not dependent upon their overlapping relation but is dependent upon the various stems and plungers in the guiding members. A vertical rib 60 is placed within the lower casing 4 between the bottom of the casing and the bar 15 so as to prevent bending of the same in the center, said rib being duplicated on the opposite side of the casing.

The operation of the spring suspension above described is as follows:

The springs 13 and 14 are made of sufficient strength to bear the weight of the body with a light load. Thus the advantage of a light flexible spring for a light load is secured. If the load be increased to a point which would tend to overload the springs 13 and 14 the secondary springs 30 and 31 come into play by engagement of the ends of the plungers with the stems 36, 37. If the load then be increased beyond the combined strength of the primary and secondary spring the plungers 46 and 47 will engage the stems 48 and bring the master springs 44 and 45 into play thus adjusting in all cases the strength of the spring to the amount of the load.

Upon rebound the pistons and the hollow stems act as dashpots easing to a certain extent the return of these parts. If desired, additional means may be provided for retarding the rebound, but I have found that this is not necessary.

While I have illustrated my invention in connection with the particular details of one embodiment thereof, I do not intend to be limited to the precise construction shown and described as the invention may appear in other forms.

I claim:

1. In combination a supporting member, a supported member, a spring having one end connected to one of said members, a rod connected to the other of said members, said rod being connected to the opposite end of the spring, a second spring connected to one of said members, a second rod connected to the other of said members, an extension carried by said second spring, and a lost motion connection between said second rod and the extension.

2. In combination a supporting member, a supported member, a spring having one end connected to one of said members, a rod connected to the other of said members, said rod being connected to the opposite end of the spring, a second spring connected to one of said members, a second rod connected to the other of said members, said second spring and said second rod being independent of the first said spring and rod, and a lost motion connection between said second rod and the other end of the spring, said lost motion connection comprising a hollow cylinder for receiving said second rod.

3. In combination, a supporting member, a supported member, a plurality of rods connected to one of said members, a supporting bar connected to the other of said members, a plurality of springs having their upper ends connected to said supporting bar, means connecting springs of less strength directly to the ends of said rods and means comprising lost motion connections of different degrees of freedom connecting the ends of other of said rods with the other springs.

4. In combination, a supporting member, a supported member, a plurality of rods connected to one of said members, a supporting bar connected to the other of said members, a plurality of springs having their upper ends connected to said supporting bar, means connecting springs of less strength directly to the ends of said rods and means comprising lost motion connections of different degrees of freedom connecting the ends of other of said rods with the other springs, and said supporting and supported members comprising telescoping casings inclosing said rods and said springs.

5. In combination, a supporting bar having socket means for receiving the end of a spring, a guiding cylinder secured to said spring, a plunger passing through said guiding bar, a connecting block having means secured to the other end of the spring and means for securing the end of the rod to said connecting block.

6. In combination a supporting bar, attaching means mounted on said supporting bar, said attaching means comprising a coil spring, a socket adapted to receive one end convolution of the coil spring, a spring washer for holding said spring in said socket, a guiding cylinder having a flange engaging said spring washer, a rod passing through said guiding cylinder, a connecting block having a seat for engaging the other end convolution of the spring, a spring ring or washer for holding said convolution in said seat on the connecting member and a flange on the rod for engaging the spring ring or washer.

7. In combination a supporting bar, attaching means mounted on said supporting bar, said attaching means comprising a coil spring, a socket adapted to receive one end convolution of the coil spring, a spring washer for holding said spring in said socket, a guiding cylinder having a flange engaging said spring washer, a rod passing through said guiding cylinder, a connecting block having a seat for engaging the other end convolution of the spring, a spring ring or washer for holding said convolution in said seat on the connecting member and a flange on the rod for engaging the spring ring or washer, and a spring for checking the rebound mounted externally of said guiding cylinder.

8. In combination, a supporting bar having socket means for receiving an end convolution of a spring, a spring seated in said socket, a guiding cylinder having means for holding the end convolution of the spring in the socket, a stem guided in said guiding cylinder and having a socket therein, said stem being secured to the opposite end of the spring, and a rod guided in the stem socket and normally spaced away from the end of said socket.

9. In combination, a supporting bar having socket means for receiving an end convolution of a spring, a spring seated in said socket, a guiding cylinder having means for holding the end convolution of the spring in the socket, a stem guided in said guiding cylinder and having a socket therein, said stem being secured to the opposite end of the spring, a rod guided in the said socket and normally spaced away from the end of said socket, and other spring means for holding said rod and said end of the socket out of engagement.

10. In combination, a casing secured to the frame of a vehicle, a second casing telescoping within said first casing, said second casing being secured to the axle of a vehicle, a plurality of plungers secured to the first casing section, a plurality of springs having one end connected to the other casing section, means connecting certain ones of said rods with the opposite ends of certain ones of the springs directly, and other means connecting other ones of said rods with the opposite ends of the other springs through lost motion connections.

11. In combination, a casing secured to the frame of a vehicle, a second casing telescoping within said first casing, said second casing being secured to the axle of a vehicle, a plurality of plungers secured to the first said casing section, a plurality of springs having one end connected to the other casing section, means connecting certain ones of said rods with the opposite ends of certain ones of the springs directly, and other means connecting other ones of said rods with the opposite ends of the other springs through lost motion connections, said lost motion connections comprising dashpot means, and a body of oil in the lower casing section.

12. In combination, a supported member, a supporting member, and a plurality of springs of varying calibration, the weaker springs having permanent connection to both of the members and to be distended by application of a weight to the supported member, and the other springs being automatically distended by the application of further weight to said member.

In witness whereof, I hereunto subscribe my name this 7th day of March, A. D. 1917.

GROVER F. SEIDENBECKER.

Copies of this patent may be obtained for five cents each, by addressing the "Commissioner of Patents, Washington, D. C."